July 22, 1947.  W. H. WEIMER  2,424,524
BORING MACHINE
Filed Sept. 18, 1942  7 Sheets-Sheet 1
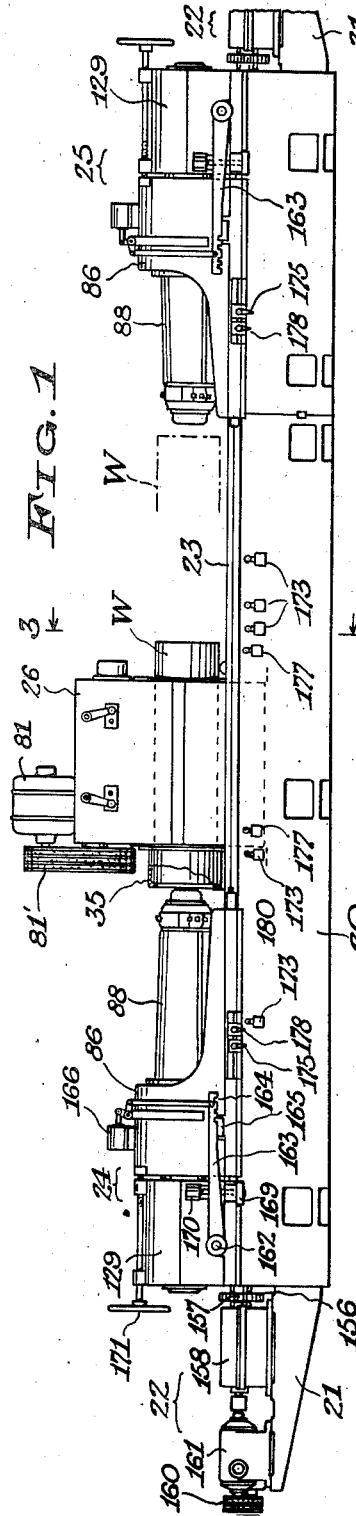
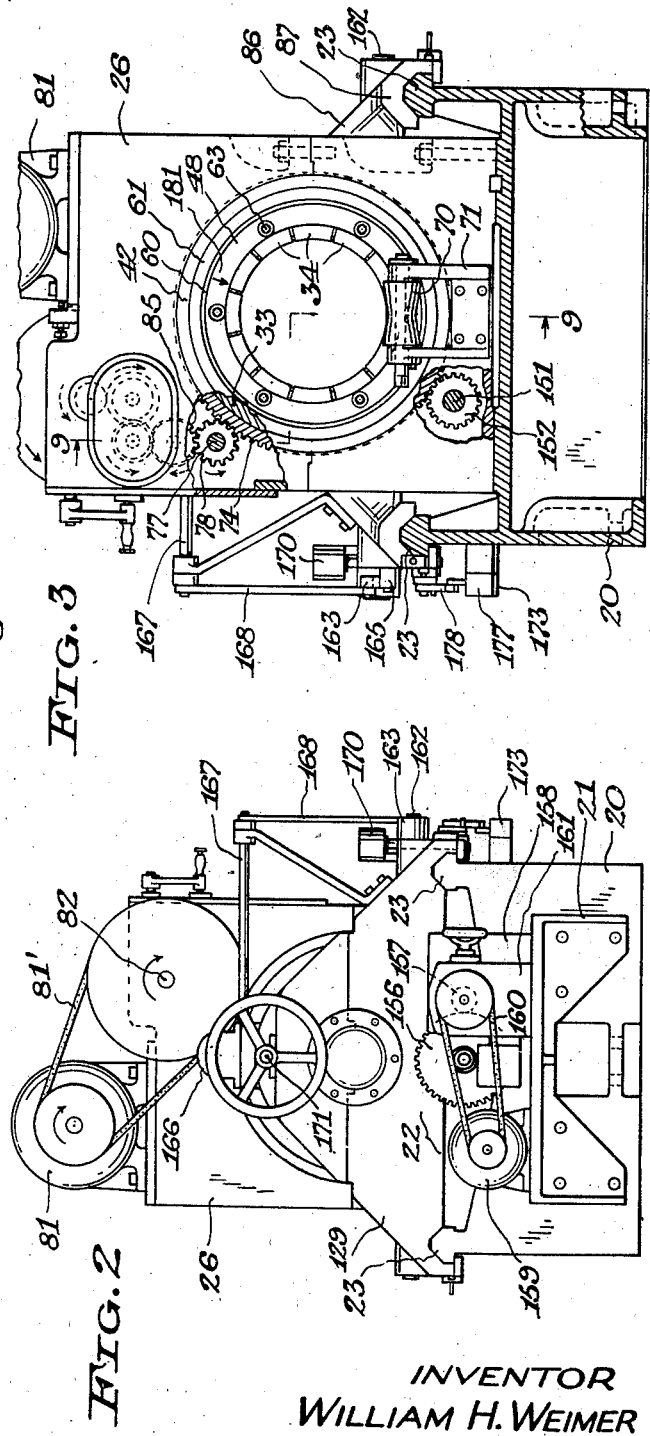
INVENTOR
WILLIAM H. WEIMER
BY Christopher L. Waal
ATTORNEY

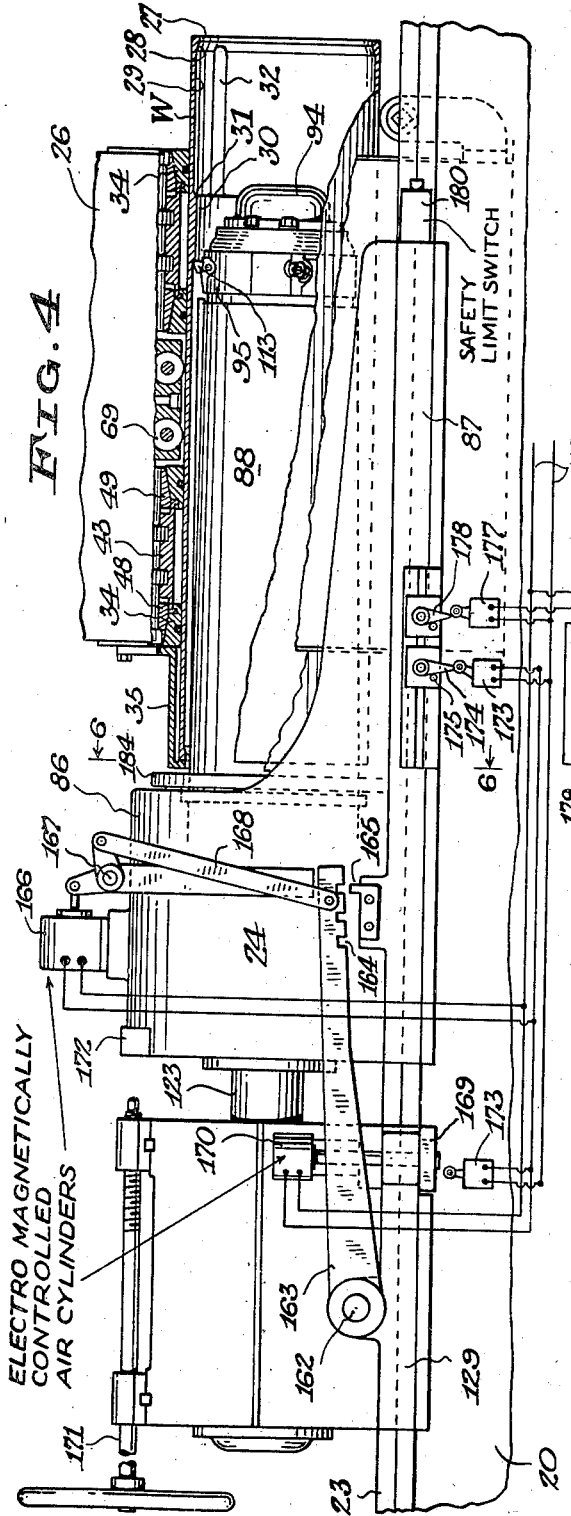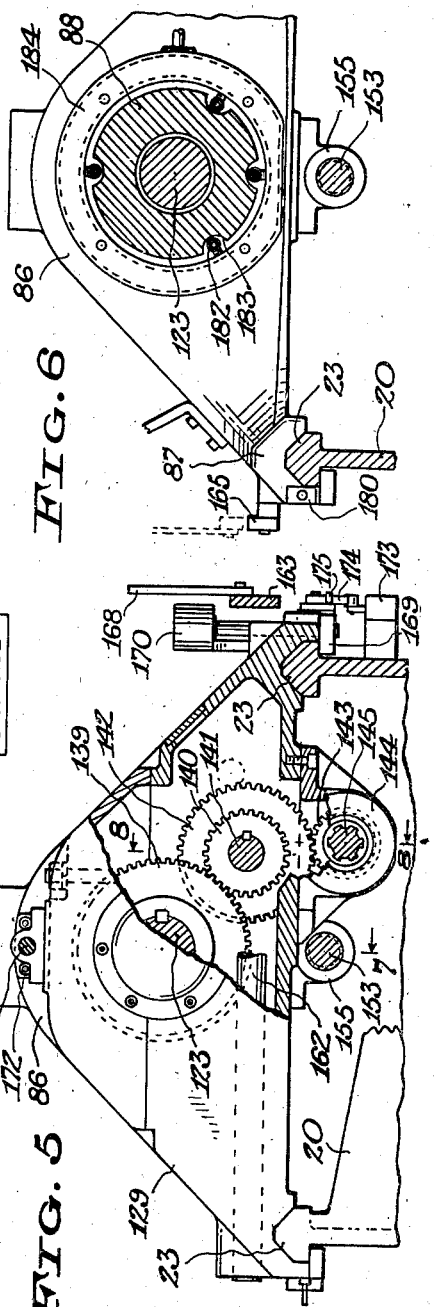

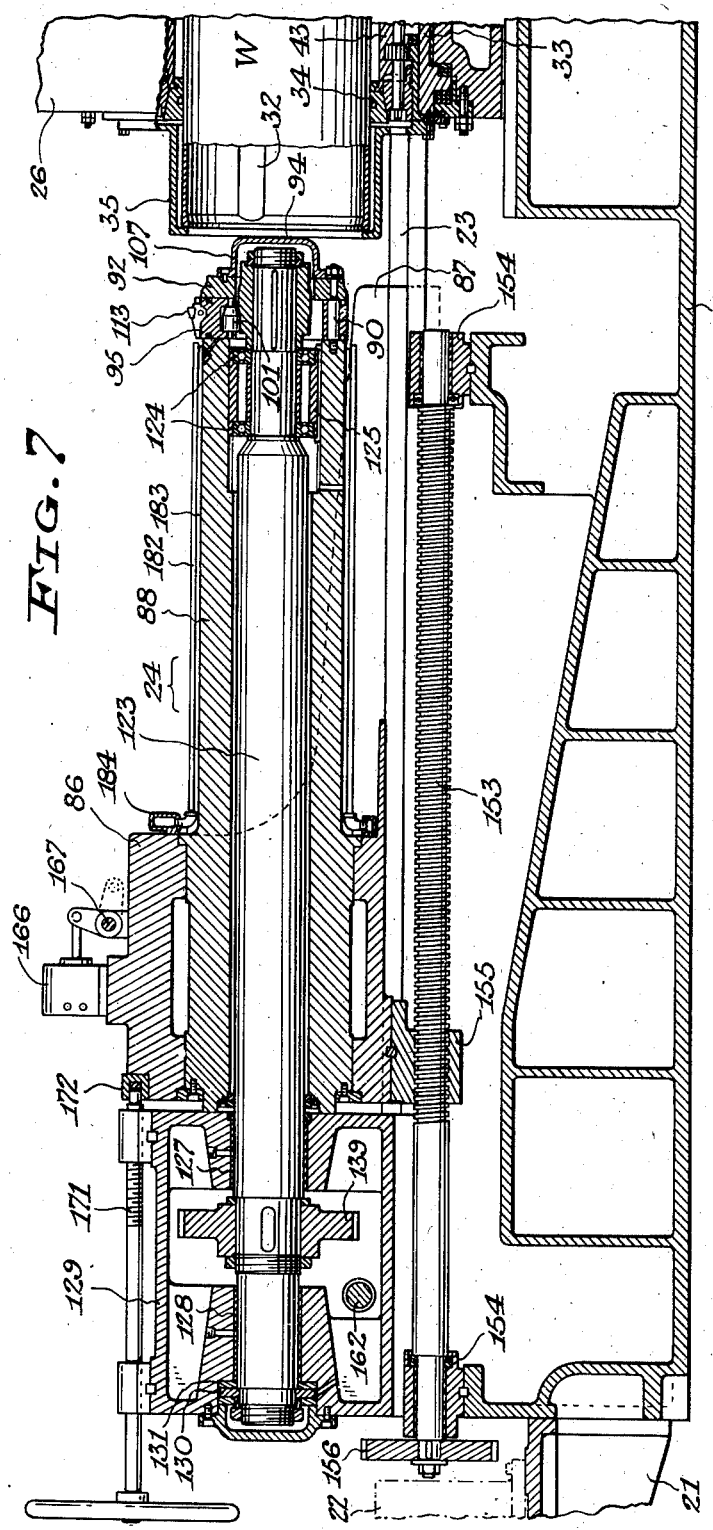

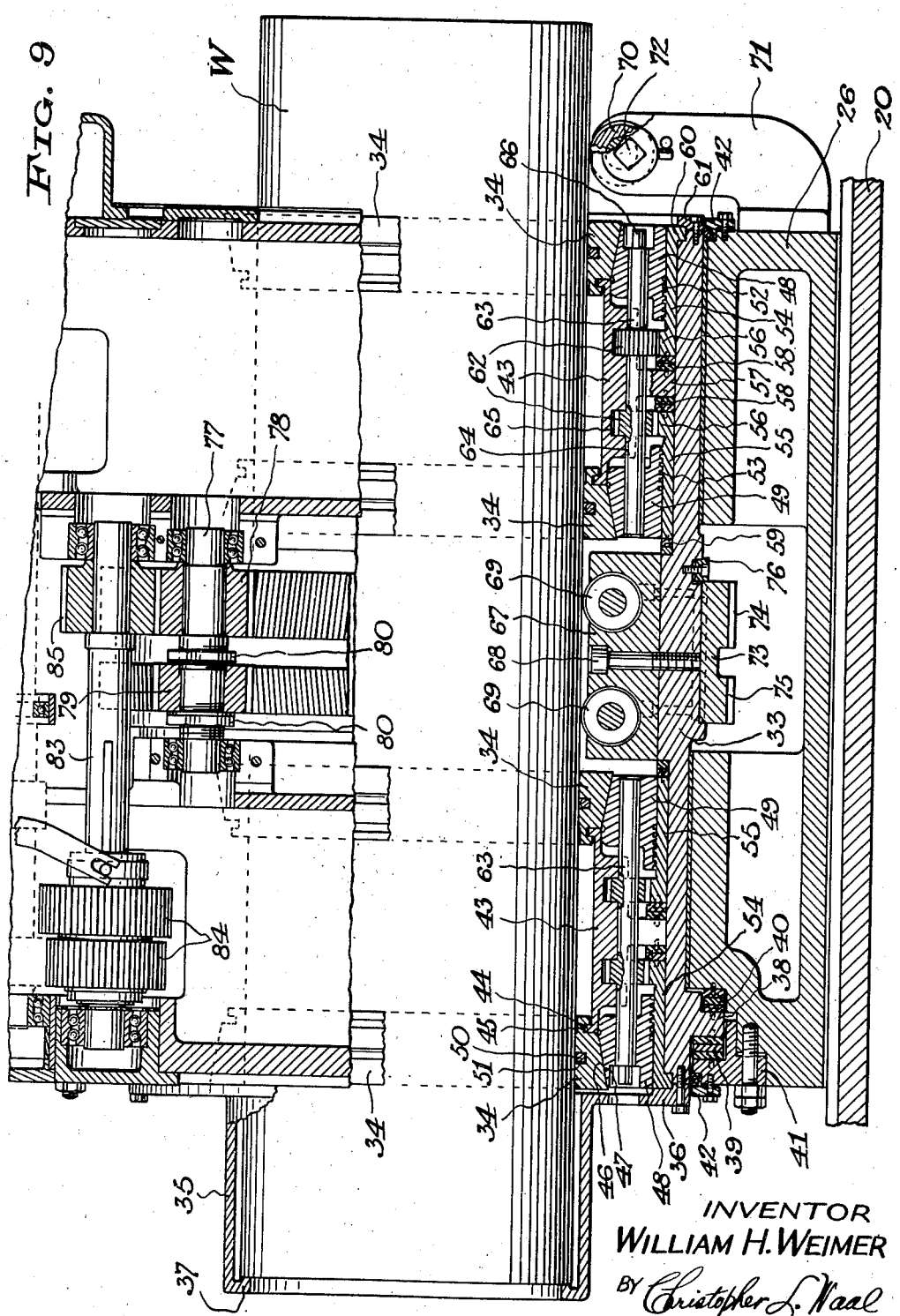

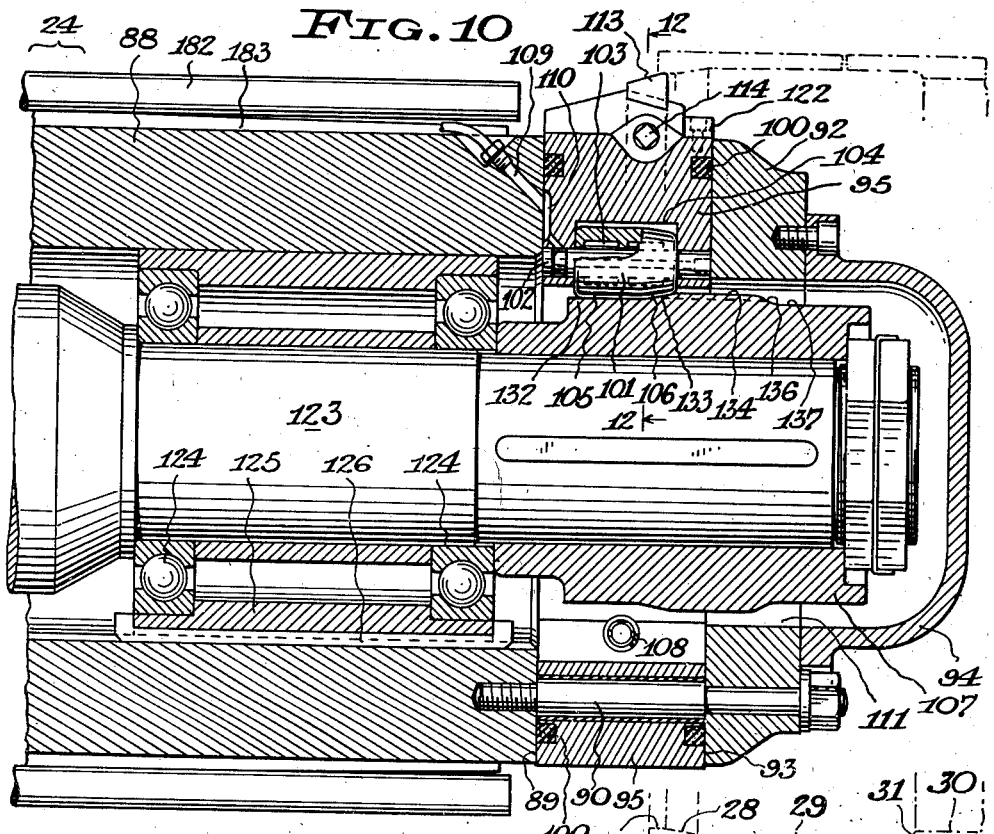
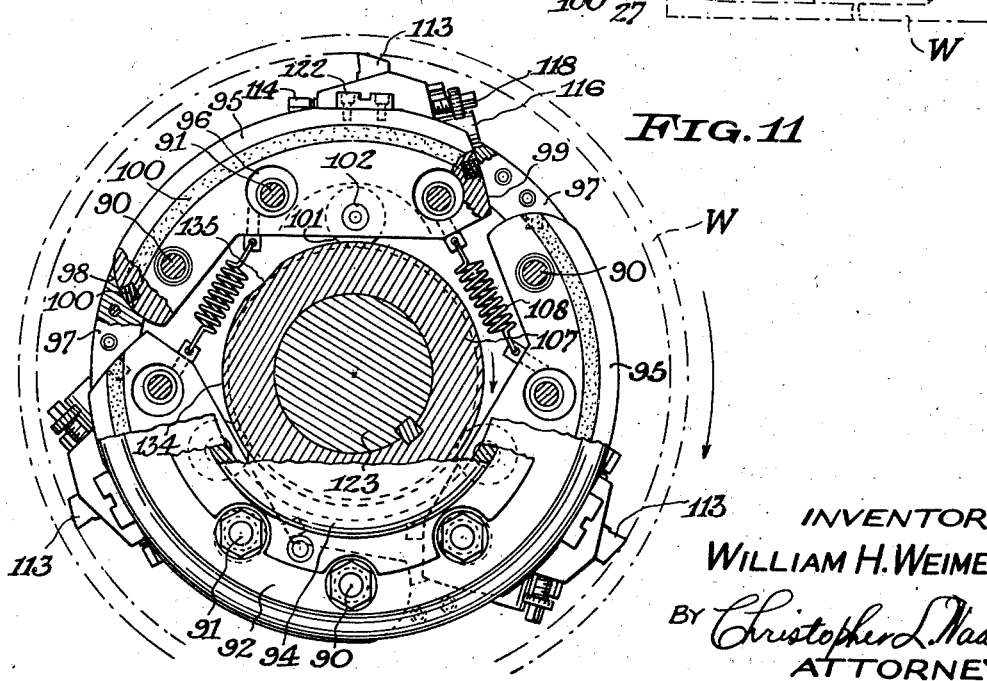

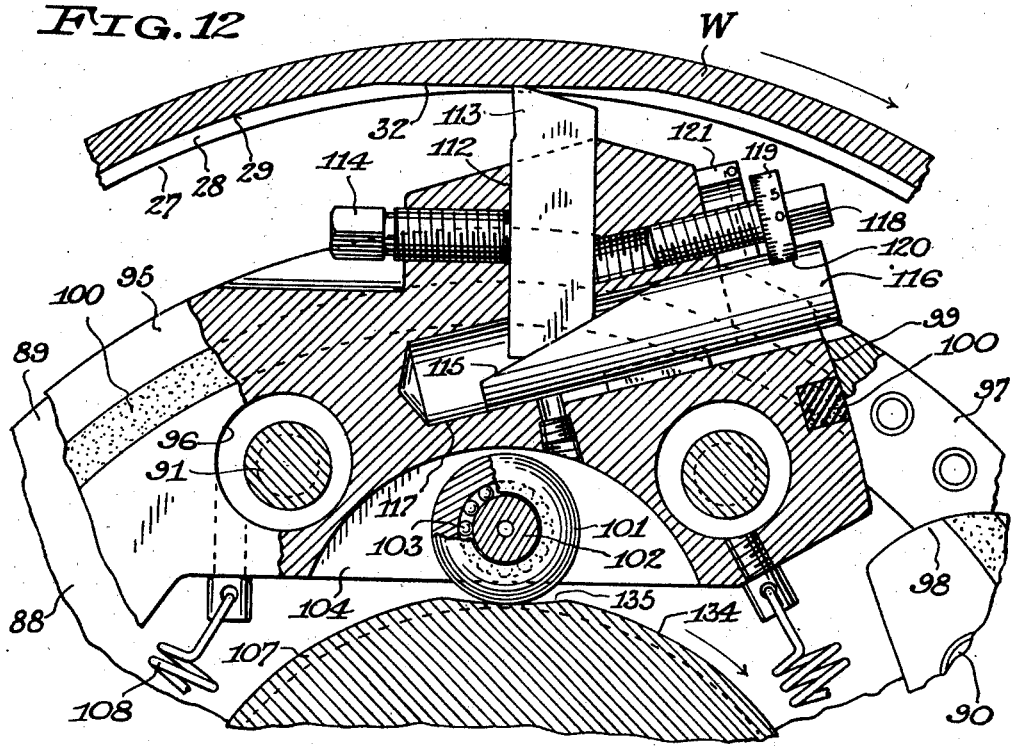
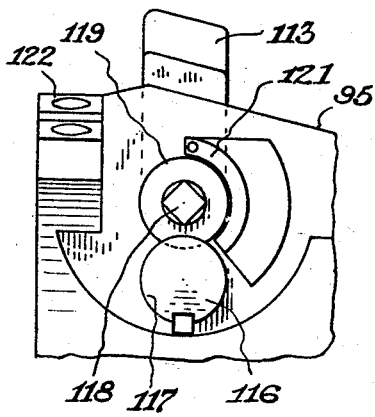
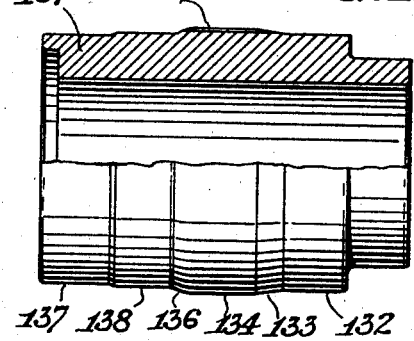
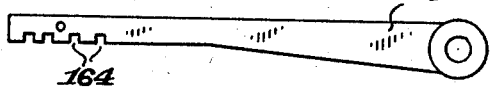

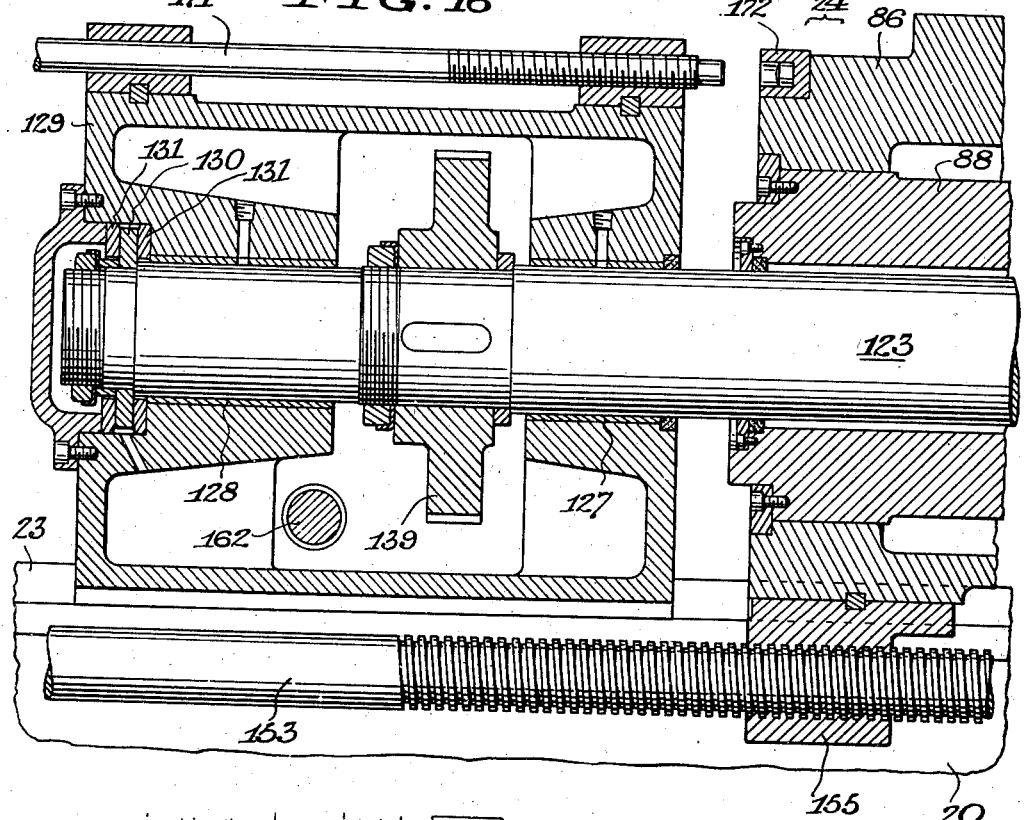
FIG. 16
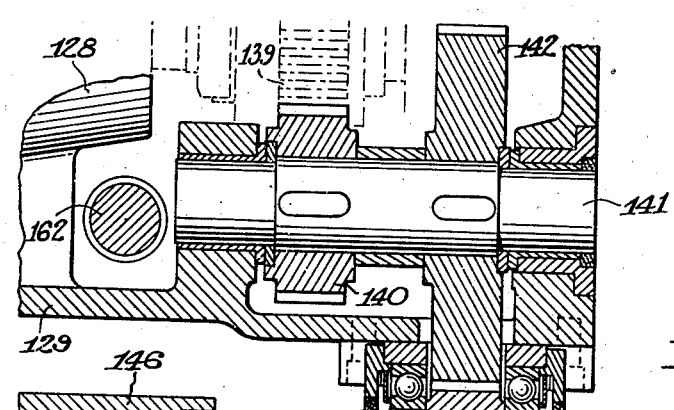
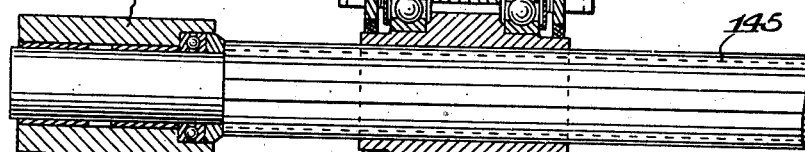
FIG. 17
INVENTOR
WILLIAM H. WEIMER
BY Christopher L. Waal
ATTORNEY Patented July 22, 1947

2,424,524

UNITED STATES PATENT OFFICE 2,424,524

BORING MACHINE

William H. Weimer, North Prairie, Wis., assignor to Davis & Thompson Company, West Allis, Wis., a corporation of Delaware Application September 18, 1942, Serial No. 458,839

9 Claims. (Cl. 77—3)

The present invention relates to machine tools and more particularly to boring machines.

An object of the invention is to provide an improved boring machine which is adapted for producing in a work piece a bore of non-circular shape in transverse section. By way of example, a tubular work piece with a longitudinal welded joint may have a bore with a flattened portion at the joint to provide extra wall thickness along the joint.

Another object of the invention is to provide a boring machine capable of automatically forming in a work piece a bore which varies in diameter at different parts of its length.

A further object is to provide a boring machine having improved means for mounting a cutting tool and for varying the effective cutting radius of the tool while the machine is in operation.

Still another object is to provide a boring machine in which the cutting tool can readily be shifted out of cutting position and freely withdrawn from the work, either at the end of a cutting operation, or before completion of the cutting operation as in the event of the tool requiring replacement.

A still further object is to provide a boring machine having improved means for mounting and rotating a tubular work piece.

The invention further consists in the several features hereinafter described and claimed.

In the accompanying drawings, illustrating one form of boring machine embodying the invention.

Fig. 1 is a front elevation of the boring machine, opposed boring heads thereof being shown in retracted position in readiness to operate on a rotatably mounted work piece.

Fig. 2 is an elevation showing the left-hand end of the machine;

Fig. 3 is a transverse sectional elevation taken generally along the line 3—3 of Fig. 1, the work piece being omitted;

Fig. 4 is a front elevation of a portion of the machine, parts being shown in section, the left-hand boring head being near the end of its boring travel, and the view also including a wiring diagram for control devices;

Fig. 5 is an end elevation of the machine, parts being omitted, parts being broken away and parts being shown in section;

Fig. 6 is a sectional elevation taken generally along the line 6—6 of Fig. 4;

Fig. 7 is a longitudinal sectional elevation of the left-hand end portion of the machine, taken generally along the line 7—7 of Fig. 5;

Fig. 8 is a longitudinal sectional elevation taken generally along the line 8—8 of Fig. 5;

Fig. 9 is a sectional elevation taken generally along the line 9—9 of Fig. 3, a work piece being mounted in chucking means of the machine;

Fig. 10 is a detail vertical sectional elevation of the tool-carrying end of one of the boring heads;

Fig. 11 is an end view of the boring head of Fig. 10, parts being broken away and parts being shown in section;

Fig. 12 is a sectional view taken generally along the line 12—12 of Fig. 10;

Fig. 13 is a detail view of a tool adjustment on the boring head;

Fig. 14 is a detail view partly in longitudinal section of a tool control cam for the right-hand boring head;

Fig. 15 is a detail view of a draw bar for the right-hand boring head;

Fig. 16 is an enlarged detail sectional view of the left-hand portion of Fig. 7, the boring head being advanced from the position of Fig. 7, and Fig. 17 is an enlarged detail sectional view of the left-hand portion of Fig. 8.

In these drawings, 20 designates an elongated bed or base frame which if desired may be of sectional construction. Secured to opposite ends of the frame are brackets 21 for supporting tool feed driving mechanisms 22. The base frame is provided along its upper front and rear portions with longitudinally extending horizontal guideways 23 arranged in parallel relation. Slidably mounted on the guideways are two opposed reciprocatory boring heads designated generally by 24 and 25 and hereinafter more fully described. Mounted on an intermediate portion of the frame and between the guideways 23 is an upstanding stationary housing 26 provided with means hereinafter described for chucking and driving a tubular work piece W which is rotatable on a horizontal axis parallel to the guideways 23.

The work piece W may have various forms but it is here shown to be a metal tube open at both ends and having a cylindrical outer surface. Preferably, this outer surface is ground or otherwise machined before the tube is mounted in the chucking means. At each end the tube has a thickened portion, Figs. 4 and 10, with a short cylindrical end bore 27 followed by a short tapered bore 28. Between the thickened ends the tube has two similar counterbores 29 and a short intermediate cylindrical bore 30 which is of smaller diameter than the counterbores, there being rounded fillets 31 at the ends of the counterbores adjacent to the intermediate bore. In some instances the work piece may have a longitudinal welded joint, and for the purpose of affording extra wall thickness along the joint, or for other reasons, the counterbores 29 are provided with aligned flattened portions 32, Figs. 4 and 12, which merge at their ends onto the tapered bores 28 and fillets 31. The boring machine of the present invention is arranged to operate on the general type of work piece above described.

The work chucking means includes a hollow or tubular power-driven shaft 33 journalled in the housing 26 to rotate about a horizontal axis parallel to the guideways 23. The shaft carries therein axially spaced sets of arcuate or segmental work-clamping jaws 34 which are adjustably mounted as hereinafter described to form two collet chucks at opposite end portions of the shaft. The tubular work piece is insertible into the hollow shaft 33 so as to project from opposite ends of the housing 26, the work piece being insertible from one end of the housing and being axially positioned by an annular stop or gage member 35 at the other end of the housing. As seen in Fig. 1, the right-hand boring head 25, in its retracted position, is spaced a sufficient distance from the chuck housing to permit insertion and removal of the work piece. The gage member 35, which surrounds the inserted work piece, has an outturned flange 36 rigidly secured to the end of the hollow shaft 33 to rotate with the shaft, and has an inturned stop flanage 37 at its outer end engageable with the end of the work piece. The work-rotating shaft 33 is provided near one end with an outwardly projecting flange 38, Fig. 9, laterally engageable with thrust washers 39 and 40 to prevent axial play of the shaft, the flange and thrust washers being confined by a ring member 41 secured to the housing 26. Oil seals 42 are provided at opposite ends of the shaft.

The chuck jaws 34 are arranged in the hollow shaft 33 in axially spaced sets, four sets of jaws being shown in the present instance and forming parts of two chuck assemblies each having two spaced sets of jaws. The two series of jaws for each chuck assembly are held in axially spaced relation by a guide ring or connector ring 43 concentric with the shaft, the guide ring having inturned annular flanges 44 at opposite ends slidably extending into peripheral grooves 45 formed in the jaws. The jaws have tapered outer surfaces 46 bearing on correspondingly tapered inner surfaces 47 of wedge rings 48 and 49, the jaws in each set being urged radially outwardly against the associated wedge ring by a resilient expansion ring 50 fitting in aligned grooves 51 formed in the inner cylindrical surfaces of the jaws. The two wedge rings 48 and 49 of each chuck assembly have respective right-hand and left-hand screw-threaded connections 52 and 53 with respective sleeves 54 and 55 surrounding the rings, the sleeves being rotatably mounted in the hollow shaft 33 and being confined in the shaft against axial movement. At their adjacent ends the two sleeves of each chuck assembly carry respective internal ring gears 56 and are spaced by a peripheral projection 57 on the jaw spacing ring 43, the projection being flanked by thrust washers 58. The inner end of each inner sleeve 55 bears against a thrust washer 59, and the outer end of each outer sleeve has an outturned flange 60 bearing against the end of the tubular shaft 33. The chuck assembly at one end of the shaft is held in the shaft by a retainer ring 61 secured to the shaft, and the other chuck assembly is retained in place by the outturned flange 36 of the gage member 35. The two ring gears 56 of each chuck assembly mesh with pinions 62 carried on a number of shafts 63 which are journalled in the two associated wedge rings 48 and 49 and are seated in radial slots or notches 64 formed in the intervening jaw-guiding ring 43, the shafts extending parallel to the shaft axis and being spaced around the wedge rings. The pinions 62 are integral with or fast on the shaft 63 and are axially confined in recesses 65 formed in the jaw-spacing ring 43. At their outer ends the pinion shafts 63 have squared wrench-receiving portions 66. By turning the pinion shafts the screw-threaded sleeves 54 and 55 are rotated relatively to the wedge rings 48 and 49, thus moving the wedge rings axially toward or away from each other to tighten or loosen the chuck jaws 34 with respect to the work piece. The jaw-spacing ring 43 and the wedge rings 48 and 49 are preferably retained against relative rotation with respect to the hollow shaft 33.

One or more blocks 67 are rigidly secured to the intermediate portion of the hollow shaft 33 at the inner side thereof, as by screws 68, and carry rollers 69 to support the work piece during its insertion into the chuck and its removal therefrom. Preferably, a plurality of the roller-carrying blocks are peripherally spaced within the shaft. The work piece is further supported during this manipulation by a saddle-type roller 70 which is mounted on a bracket 71 secured to the lower portion of the housing 26, the roller having an eccentric adjustment 72 to vary its elevation.

An external ring gear 73 is keyed to the intermediate portion of the hollow shaft 33 and comprises two axially spaced gear sections 74 and 75 forming in effect a herringbone gear. The ring gear is held against a shouldered portion of the shaft by wedge blocks 76. A pinion shaft 77 is journalled in the chuck housing in parallel relation to the hollow shaft 33 and carries pinions 78 and 79 meshing with the gear sections 74 and 75 respectively, the pinion 79 being axially shiftable on the shaft 77 to take up back-lash and being retained between adjustable clamping nuts 80. The pinion shaft 77 is driven through adjustable-speed gearing connections of any suitable type from an electric motor 81 mounted on the chuck housing. The motor is here shown to have a belt drive connection 81' with a countershaft 82, and the gearing connection further includes a shaft 83, Fig. 9, having a shiftable change-speed gear 84 and having a pinion 85 meshing with the pinion 78 on the shaft 77.

The reciprocatory boring heads 24 and 25 are generally similar and a description of one will serve for both. Each boring head comprises a carriage 86 slidable on the guideways 23 and provided with spaced arms 87 extending along the guideways to insure stability, these arms being adapted to straddle the chuck housing 26 during the travel of the carriage. Rigidly secured to the carriage is a forwardly projecting tubular boring bar 88 which extends coaxially of the rotatable work-carrying shaft 33. The front end of the tubular boring bar 88 has a flat face 89, Fig. 10, normal to the axis of the bar and has secured thereto a plurality of shoulder studs 90 and 91, Figs. 10 and 11, extending parallel to the bar axis. Rigidly secured to the front ends of the studs is a ring member 92 having a flat face 93 spaced forwardly from and parallel to the flat end face 89 of the boring bar. A cap member 94 is secured to the front face of the ring member 92. Fitting between the spaced flat parallel faces 89 and 93 are one or more parallel-sided tool holders 95, three being shown in the present instance. The tool holders are in the form of bent or arcuate lever arms pivotally mounted on the equally-spaced shoulder studs 90, and are swingable through a limited angle in a plane normal to the boring bar axis. The shoulder studs 91 pass through clearance openings 96 in the tool holders, Figs. 11 and 12, so as not to interfere with the pivotal movement of the tool holders. The spaces between the adjacent ends of the pivoted tool holders are occupied by filler blocks 97, Figs. 11 and 12, secured to the flat front end face 89 of the boring bar, and each tool holder has curved ends 98 and 99 concentric with its pivot stud 90 and slidably fitting against the adjacent filler blocks. Sealing strips 100 of oil-resisting synthetic rubber or other suitable material are set into the sides and ends of the pivoted tool holders to prevent oil leakage. Each tool holder is provided at an intermediate portion with a roller 101 which is carried on a pivot pin 102 extending parallel to the boring bar axis, the roller being mounted on roller bearings 103 and extending into a recess 104 formed in the tool holder. The roller 101, which is formed with rounded ends, has a cylindrical rear portion 105 and a tapered front portion 106, and is adapted to bear on a rotatable and axially shiftable control cam 107 hereinafter more fully described. The several rollers 101 are urged inwardly against the cam 107 by coiled tension springs 108 connecting adjacent tool holders. Lubricant is conducted to the working parts of the upper tool holder by a duct 109 in the front end portion of the boring bar, Fig. 10, this duct communicating with a recess 110 formed in the rear face of the adjacent tool holder. The several tool holders, filler blocks, ring member 92 and cap member 94 define walls of a lubricant chamber 111 at the front end of the boring bar.

Each tool holder has an opening 112, Fig. 12, for receiving a cutter bit 113 which is clamped in place by a set screw 114, the opening extending approximately radially with respect to the axis of the boring bar. The inner end of the cutter bit is beveled and bears on a cam face 115 formed on a shiftable wedge rod 116. The wedge rod is slidably mounted in a bore 117 and is keyed to prevent rotation in the bore. A micrometer screw 118 is threaded into the tool holder in parallel relation to the wedge rod and has a calibrated collar or flange 119 which engages in a rectangular notch 120 formed in the side of the wedge rod and which cooperates with an index member 121 secured to the lever arm. By turning the micrometer screw in or out the wedge rod 116 is longitudinally shifted, thus radially adjusting the cutter bit 113. Each tool holder carries a gage block 122 near the cutter bit so as to facilitate gaging operations.

The control cam 107 is rigidly keyed on the reduced front end of a shaft 123 extending longitudinally through the tubular boring bar 88. The front end portion of the cam shaft is mounted on a pair of axially spaced ball bearings 124, the outer races of which are carried in a sleeve or quill 125 slidable in the boring bar. The quill 125 is prevented from rotating in the boring bar by a key 126. The rear end portion of the cam shaft is journalled in spaced bearings 127 and 128 formed in a support 129 which is movable with the boring head carriage 86. The support 129 is preferably in the form of a follower carriage slidable on the guideways 23 immediately behind the boring head carriage. Near its rear end the cam shaft 123 carries a disk 130, Fig. 16, engageable with thrust washers 131 on the carriage 129 to prevent relative longitudinal movement of the cam shaft and this carriage. As hereinafter more fully described, the two carriages are releasably coupled for simultaneous travel, and are capable of a limited relative longitudinal movement to vary the position of the cam 107 with respect to the tool holders.

The cam 107 for the left-hand boring head, Fig. 10, has several active portions, namely, a rear cylindrical portion 132 which determines the position of the cutter bits in forming the bore 27 in the work piece, a tapered portion 133 which controls the position of the cutter bits in forming the tapered bore 28, a cylindrical portion 134 of larger diameter than the portion 132 for determining the position of the cutter bits in forming the counterbore 29, a longitudinally extending flat or dip 135 in the cylindrical portion 134 for controlling the position of the cutter bits in forming the flat portion 32 in the work piece, a rounded portion 136 for controlling the position of the cutter bits in forming the fillet 31, and a cylindrical portion 137 on which the cam rollers rest after completing the cutting operation. The cam 107', Fig. 14, for the right-hand boring head has similar cam portions and also an additional cam portion 138 which determines the position of the cutter bits in forming the intermediate bore 30.

Within the follower carriage 129 and between the bearings 127 and 128 the cam shaft carries a gear 139, Figs. 5, 7, and 16, which meshes with a pinion 140 on a countershaft 141 journalled in this carriage. The countershaft 141, Figs. 5, 8, and 17, carries a larger gear 142 which meshes with a pinion 143 rotatably mounted in a casing 144 secured below the carriage member. The pinion 143 is splined on a shaft 145 which is carried by bearing members 146 secured to the base frame of the machine. The spline shaft has a reversing gear connection 147 to a shaft 151 journalled in the chuck housing 26, the shaft 151 carrying a pinion 152, Figs. 3 and 8, meshing with the ring gear 74 of the hollow work-carrying shaft 33. The drive gearing for the cam shaft is preferably so arranged that the cam shaft and work carrier rotate at the same rate of speed and in the same direction, although, in some instances, the cam shaft and work carrier may rotate at different speeds and also in opposite direction.

The boring head carriage 86 is advanced and retracted along the guideways 23 by a screw shaft 153 which is journalled at opposite ends in bearing members 154 secured to the base frame, the screw shaft extending longitudinally below the carriage member and engaging a screw-threaded fitting 155 secured to the carriage member. At its outer end the screw shaft carries a gear 156 meshing with a pinion 157 on the shaft of a speed reducer 158 forming a part of the tool feed operating mechanism 22. The mechanism 22 further includes an electric motor 159, Fig. 2, which has a belt drive connection 160 with a hydraulic speed changing device 161 coupled to the speed reducer 158.

The follower carriage 129 has a horizontal cross shaft 162 on the front end of which is mounted a coupling member or draw bar 163, Fig. 4, extending along the side of the boring head carriage 86. The free end portion of the pivoted draw bar has a series of notches 164 along its bottom edge, and an upwardly projecting lug 165 rigidly secured to the boring head carriage is adapted to enter any one of these notches, so as to couple the two carriage for simultaneous travel. The draw bar 165' for the right-hand boring head, shown in Fig. 15, is similar except that it has an additional notch. Each draw bar can be lifted out of engagement with the associated lug 165 by a suitable actuating device such as an electromagnetically controlled air cylinder 166 mounted on the boring head carriage 86. The actuating connection is here shown to include an armed rock shaft 167 and lifting link 168. The follower carriage 129 is provided with a brake 169 operated by an electromagnetically controlled air cylinder 170 so as to hold this carriage stationary when the draw bar is released. The two carriages can also be manually separated by a hand screw 171 rotatably mounted on the follower carriage 129 and engageable with a thrust block 172 on the boring head carriage 86, the purpose of the separation being to axially shift the cam shaft 123 with respect to the boring head carriage and thus radially retract the cutter bits so as to permit withdrawal of the boring head from the work piece. The air cylinders are energized by means of a suitable electric circuit including spaced limit switches 173 mounted on the front wall of the base frame of the machine. A pivoted finger 174 is adjustably mounted on the boring head carriage 86 and is adapted to actuate the limit switches in succession during the forward travel of the carriage. A stop pin 175 holds the finger in normal position during the forward travel of the carriage, but permits free swinging of the finger during the retracting travel of the carriage member. The control circuit, which is normally open, includes supply conductors 176 and is closed by the operation of either of the limit switches.

In order to stop the forward travel of the boring head after completing the boring operation, and also to effect retraction of the boring head, an additional limit switch 177 is mounted on the base frame. The switch is actuated by a finger 178 on the boring head carriage, the finger 178 being similar to the finger 174. The limit switch 177, when closed, energizes a suitable tool feed control device 179, serving either to reverse the tool feed motor 159 or to adjust the hydraulic speed changing device 161, or both.

One of the carriage extension arms 87 of the boring head 24 has mounted thereon a safety limit switch 180 connected in a suitable control circuit, not shown, for stopping the operation of the machine. The limit switch is engageable by the corresponding extension arm of the other boring head 25, so that if for any reason the boring head 24 fails to retract after completing its cutting operation the limit switch will be actuated by the approaching boring head 25, thus avoiding damage to the mechanism.

In operation, the work piece W is inserted into the chucking means of the housing 26 while the chucking means is stationary and while the boring heads 24 and 25 are in their retracted positions, as seen in Fig. 1. During this insertion the work piece rolls along the saddle-shaped guide roller 70 and along the inner guide rollers 69, and finally engages the gage member 35. It is necessary to have the work piece properly oriented in the chucking means because of the flat portions 32 in the work piece, and for this purpose the rotatable work carrier has a suitable index mark 181, Fig. 3. The two sets of chuck jaws are then contracted into driving engagement with the finished exterior walls of the work piece by turning the pinion shafts 63, this manipulation spacing the work piece from the guide rollers 69 and 70. The chuck is then rotated by the motor 81 through the transmission gearing, and the tool control cams 107 and 107' for the boring heads are rotated synchronously with the chuck through the connected gearing. The feeding mechanisms 22 for the boring heads are also set into action, causing the two boring heads to be advanced along the guideways 23 by the feed screws 153. The tools 113 of the left-hand boring head 24 reach the work piece first, and form the short cylindrical bore 27 in the work piece. When these tools reach the inner end of the bore 27 the first limit switch 173 is actuated by the finger 174, causing the air cylinder 166 to lift the draw bar 163 out of engagement with the coupling lug 165, and also causing the air cylinder 170 to brake the follower carriage 129. The follower carriage thereupon stops for a time while the boring head carriage 86 continues its travel, causing the rollers 101 of the pivoted tool holders 95 to ride up on the tapered surface 133 of the cam 107 and onto the enlarged cylindrical portion 134 of the cam. During the first part of this period the pivoted tool holders 95 are gradually forced outwardly against the action of the springs 108, causing the tools to form the short inclined bore 28 in the work piece, and in the latter part of the period the tools start the formation of the counterbore 29. During the rotation of the cam the rollers 101 also ride on the flat or dip 135 of the cam, causing the tools to form the flattened portion 32 in the work piece, this flattened portion 32 merging with the tapered bore 28. The finger 174 on the boring head carriage is now released from the first limit switch 173, causing the air cylinders 170 and 166 to exhaust, thereby releasing the brake 169 and permitting the draw bar 163 to drop and to reengage the coupling lug 165 at the next notch 164. The cam-controlling follower carriage 129 then travels with the boring head carriage 86 and the cutting tools continue the formation of the counterbore 29 with its flattened portion 32 until the tools reach a point near the fillet 31. At this point the finger 174 actuates the next limit switch 173, as seen in Fig. 4, effecting operation of the air cylinders to release the draw bar and to apply the brake to the follower carriage 129, holding the latter stationary for another period while the boring head carriage continues to advance. The tools then complete the counterbore 29, and as the tool holder rollers 101 ride down the curved portion 136 of the cam the tools are gradually retracted inwardly and form the fillet 31 in the work piece, the final radius of the tools being less than the radius of the intermediate bore 30 so as to clear this bore as well as the entrance bore 27. The finger 174 is then released from the limit switch 173, causing release of the brake 169 and causing the draw bar 163 to reengage the coupling lug at the last notch. Shortly thereafter the finger 178 actuates the limit switch 177 which controls the feed mechanism for the boring head, stopping the forward travel of the boring head and effecting withdrawal of the boring head from the work piece to its fully retracted position. During the withdrawal of the boring head, the tools clear the various bores in the work piece.

The right-hand boring head 25 has a similar cycle of operation but further produces the intermediate bore 30 in the work piece, the surface 138 on the cam 107', Fig. 14, determining the position of the tools during the formation of this bore. Both of the opposed boring heads 24 and 25 start on their advancing travel at about the same time, but the boring head 24 finishes its cutting operation and is withdrawn before the boring head 25 begins its cutting operation, so as to avoid interference. However, it would be possible for both boring heads to operate on the work piece simultaneously, provided their end caps 94 do not strike each other. The safety limit switch 180 serves to stop the machine in case the boring heads approach each other too closely.

In boring the work piece it is usually desirable to take two or more cuts, say two roughing cuts and one finishing cut. For the roughing cuts each boring head is equipped with three tools as indicated, while the finishing cut is preferably made using only one tool in each head, the other two tools being removed or rendered inactive.

The gage blocks or set plates 122 on each boring bar facilitate the use of a setting gage for the tools and are ground so that their outer surfaces are equidistant from a reference mark on the inside of the collet chuck, thus insuring accurate setting of the tools regardless of possible deflection of the boring bar due to the long overhang.

During the operation of the boring machine coolant fluid is conducted to the tools, as by tubes 182 extending along longitudinal grooves 183 formed in the outer surface of the boring bar, the tubes being connected at their rear ends to an annular supply manifold 184 surrounding the boring bar and secured to the boring head carriage 86.

While the work carrier and tool-controlling cam shaft preferably rotate at the same speed and in the same direction, this relation may be varied. For example, in the machine illustrated, the cam shaft may rotate at one-half the work carrier speed and in the opposite direction when three tools are used on the boring head. When a single tool is used the cam shaft and work carrier may be arranged to rotate in opposite directions at the same speed. In the case of a boring head having a single tool operating on a work piece having a bore with opposite flat portions, the cam shaft may be arranged to rotate at twice the work carrier speed, either in the same direction as the work carrier or in the opposite direction.

It will be understood that various modifications in the machine may be made without departing from the spirit of the invention.

What I claim as new and desire to secure by Letters Patent is:

1. In combination, a boring head, a carrier rotatable relatively to said head and adapted to hold a work piece, said head and carrier having an axis of relative rotation and being relatively movable in an axial direction, a boring tool shiftably carried by said head and displaceable in a direction transverse to said axis to vary the cutting radius, means relatively rotatable with respect to said boring head for varying the cutting radius of the tool during each revolution, and means operable at a predetermined speed during the boring operation for effecting the relative rotation of said last-named means through a plurality of revolutions with respect to said boring head.

2. In combination, means for supporting a work piece, a boring head adapted to operate on the work piece, a tool shiftably carried by said head and transversely displaceable to vary the cutting position, and cam means rotatable relatively to said head at a predetermined speed during the cutting operation for varying the cutting radius of said tool during each revolution to produce in the work piece a bore of non-circular shape.

3. In combination, a tubular support adapted to enter a work piece and having an opening with axially spaced parallel walls perpendicular to the axis of the support, a tool holder movably fitting between said walls and pivotally mounted on said support to turn on an axis parallel to said support axis, said holder having ends fitting against the ends of said opening, and lubricant-sealing strips extending along the opposite sides and opposite ends of said tool holder, said holder forming the outer wall member of a lubricant chamber.

4. In combination, a frame having guideways, a rotatable work carrier having an axis of rotation parallel to said guideways and adapted to hold a work piece, a reciprocatory boring head movable along said guideways and adapted to enter the work piece, a tool shiftably carried by said head and displaceable transversely of said axis to vary the cutting radius, a rotatable cam-carrying actuator extending longitudinally of said head for shifting said tool during the boring operation, said actuator being rotatable through a plurality of revolutions with respect to said boring head, and means for rotating said carrier and actuator during the boring operation at a predetermined speed ratio.

5. In combination, a frame having guideways, a rotatable work carrier having an axis of rotation parallel to the guideways and adapted to hold a work piece, a reciprocatory boring head carriage movable along said guideways and having a projecting part adapted to enter the work piece, a tool shiftably carried by said part and displaceable transversely of said axis to vary the cutting radius, an actuator extending longitudinally of said carriage for shifting said tool, a follower carriage movable along said guideways with said boring head carriage during the boring operation and having a connection with said actuator, means for selectively coupling said carriages at different axially displaced positions, and means for releasing the coupling of said follower carriage to said boring head carriage to relatively shift said actuator with respect to said boring head carriage.

6. In combination, a frame having guideways, a rotatable work carrier having an axis of rotation parallel to the guideways and adapted to hold a work piece, a reciprocatory boring head carriage movable along said guideways and having a projecting part adapted to enter the work piece, a tool shiftably carried by said part and displaceable transversely of said axis to vary the cutting radius, an actuator extending longitudinally of said carriage for shifting said tool, means for moving said carriage along said guideways, a follower carriage movable along said guideways with said boring head carriage during the boring operation and having a connection with said actuator, a coupling member pivotally mounted on one of said carriages and having a releasable connection with the other carriage for selectively connecting said carriages at different axially displaced positions, and means for releasing said coupling member to permit adjustable separation of said carriages and thereby effect relative shifting of said actuator with respect to said boring head carriage.

7. In combination, a work carrier, a boring head, said work carrier and boring head being relatively rotatable and being relatively movable in an axial direction, a tool on said boring head, and means operable during the relative axial travel of said boring head and work carrier for automatically varying the cutting radius of said tool during each revolution of the work with respect to the boring head.

8. In combination, a frame having spaced guideways, a rotatable work carrier having an axis of rotation parallel to said guideways, a supporting housing for said carrier disposed between said guideways, and a boring head having a carriage movable along said guideways during the boring operation and having a forwardly projecting boring bar with a tool-carrying free end portion, said carriage having projections extending forwardly thereof along said guideways and straddling said housing during the travel of said carriage.

9. In combination, a boring head, a tool holder on said head having a socket and an opening extending transversely of said socket, a cutter in said socket, a clamping member for said cutter, a cutter-adjusting member slidable in said opening having a cam portion engageable with said cutter and having a lateral recess, a micrometer screw threaded in said holder in parallel relation to said cutter-adjusting member and having an enlargement engageable in the recess of said adjusting member for longitudinally shifting said adjusting member, and means for shifting said tool holder with respect to said head to vary the cutting radius.

WILLIAM H. WEIMER.

REFERENCES CITED

The following references are of record in the file of this patent:

UNITED STATES PATENTS

| Number | Name | Date |
|---|---|---|
| 528,381 | Norton | Oct. 20, 1894 |
| 2,297,106 | LeTourneau | Sept. 29, 1942 |
| 1,878,175 | Oyen | Sept. 20, 1932 |
| 1,230,034 | Rollings | June 12, 1917 |
| 2,092,101 | Wickersham et al. | Sept. 7, 1937 |
| 1,202,139 | Witanowski | Oct. 24, 1916 |

FOREIGN PATENTS

| Number | Country | Date |
|---|---|---|
| 167,401 | Great Britain | Aug. 11, 1921 |
| 356,083 | Germany | July 12, 1922 |